United States Patent [19]

Meiss et al.

[11] 4,139,724

[45] Feb. 13, 1979

[54] CERAMIC END SEAL DESIGN FOR HIGH TEMPERATURE HIGH VOLTAGE NUCLEAR INSTRUMENTATION CABLES

[75] Inventors: James D. Meiss, Berkeley, Calif.; Collins P. Cannon, Kennewick, Va.

[73] Assignee: The United States of America as represented by the United States Department of Energy, Washington, D.C.

[21] Appl. No.: 841,775

[22] Filed: Oct. 13, 1977

[51] Int. Cl.² .............................................. H02G 15/22
[52] U.S. Cl. .................................. 174/19; 174/75 C; 174/77 R; 174/80
[58] Field of Search ............... 174/19, 20, 74 R, 75 C, 174/77 R, 80, 152 GM

[56] References Cited

U.S. PATENT DOCUMENTS

| | | | |
|---|---|---|---|
| 3,017,452 | 1/1962 | Rongred | 174/152 GM |
| 3,904,264 | 9/1975 | Oertle | 174/77 R X |

*Primary Examiner*—Thomas J. Kozma
*Attorney, Agent, or Firm*—Dean E. Carlson; Richard E. Constant

[57] ABSTRACT

A coaxial, hermetically sealed end structure is described for electrical instrumentation cables. A generally tubular ceramic body is hermetically sealed within a tubular sheath which is in turn sealed to the cable sheath. One end of the elongated tubular ceramic insulator is sealed to a metal end cap. The other end of the elongated tubular insulator has an end surface which is shaped concave relative to a central conductor which extends out of this end surface. When the end seal is hermetically sealed to an instrumentation cable device and the central conductor is maintained at a high positive potential relative to the tubular metal sheath, the electric field between the central conductor and the outer sheath tends to collect electrons from the concave end surface of the insulator. This minimizes breakdown pulse noise generation when instrumentation potentials are applied to the central conductor.

8 Claims, 2 Drawing Figures

CERAMIC END SEAL DESIGN FOR HIGH TEMPERATURE HIGH VOLTAGE NUCLEAR INSTRUMENTATION CABLES

BACKGROUND OF THE INVENTION

This invention was made under U.S. Government Contract No. AT (45-1) 2170.

The present invention relates to coaxial end seals for use with nuclear instrumentation cables and sensors. The design is particularly directed towards applications where the cable and end seal are subjected to high temperatures, on the order of 700° C, and high voltage of about 1000 volts DC, across the center wire and sheath of the cable, and the high radiation fluxes which are found in breeder reactors.

A particular problem with such instrumentation cables is the phenomenon known as breakdown pulse noise. Breakdown pulse noise is produced by small electrical discharges with a charge content of approximately $10^{-13}$ Coulombs, and a rise time of approximately 200 nanoseconds. These electrical discharges occur across the ceramic insulators at elevated temperatures and high DC voltages. This breakdown pulse noise not only prevents the acceptable operation of pulse-type reactor instrumentation systems, but can also be intense enough to render the instrumentation component permanently inoperable. Such instrumentation cables typically are connected to in-core radiation detectors, sensors, and other neutron responsive sensors. The instrumentation cable itself typically is a coaxial cable with a center wire surrounded by a metal oxide insulator such as aluminum oxide, and encased within a metallic tubular sheath. The center wire and the tubular wire are both typically made of Inconel 600 stainless steel. The cable itself is typically pressurized with a high pressure of several hundred psi of nitrogen, with a small amount of helium which facilitates leak checking of the cable.

A ceramic to metal end seal is provided at a terminal end of the instrumentation cable, which may be several hundred feet from the actual neutron detector or other such sensor, and outside of the containment vessel. The gas breakdown which is responsible for the breakdown pulse noise problem is the result of two physical mechanisms which occur across the ceramic end face. A first mechanism is thermionic emission, and the second is secondary electron emission. Theoretical considerations of electrical breakdown across a dielectric surface at room temperature show that breakdown is initiated by thermionic emission of electrons from a dielectric surface. This effect causes the surface to become positively charged, creating an electric field which tends to draw the electrons back toward the dielectric. The electrons in falling back upon the insulating surface have sufficient energy to knock other electrons out of the surface of secondary emission. At the breakdown voltage, the surface charge reaches a critical value that allows the secondary emission of electrons to proceed with efficiency greater than 1. The large number of electrons released form a breakdown pulse. A reduction of the collection of thermionic electrons by this dielectric surface would result in an improvement in the breakdown threshold. The end seal structure of the present invention accomplishes this reduction by constructing the dielectric ceramic end surface such that the applied voltage draws the emitted electron away from the surface of the ceramic rather than towards it.

SUMMARY OF THE INVENTION

An improved ceramic end seal design for high temperature, high voltage nuclear instrumentation cables is described in which the end surface of the ceramic end seal body facing the cable termination has a concave shape relative to the central conductor which extends from the cable and is continued centrally through the ceramic body. The ceramic body has a metallized outer surface which permits braze hermetic sealing to the cable sheath. The central conductor is sealed at the other end of the ceramic body to an end cap. The central conductor is maintained at a high positive potential relative to the tubular metal sheath. The electric field between the central conductor and the outer sheath tends to collect electrons from the concave end surface of the insulator and direct the electrons back to the positively biased central conductor. This minimizes breakdown pulse noise generation when instrumentation potentials are applied to the central conductor.

DESCRIPTION OF THE PREFERRED EMBODIMENT

Figure 1:
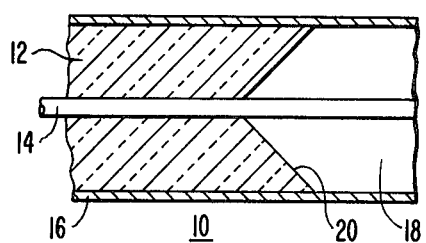
FIG. 1 is a side elevational view in section of the concave ceramic end seal structure of the present invention.
Figure 2:
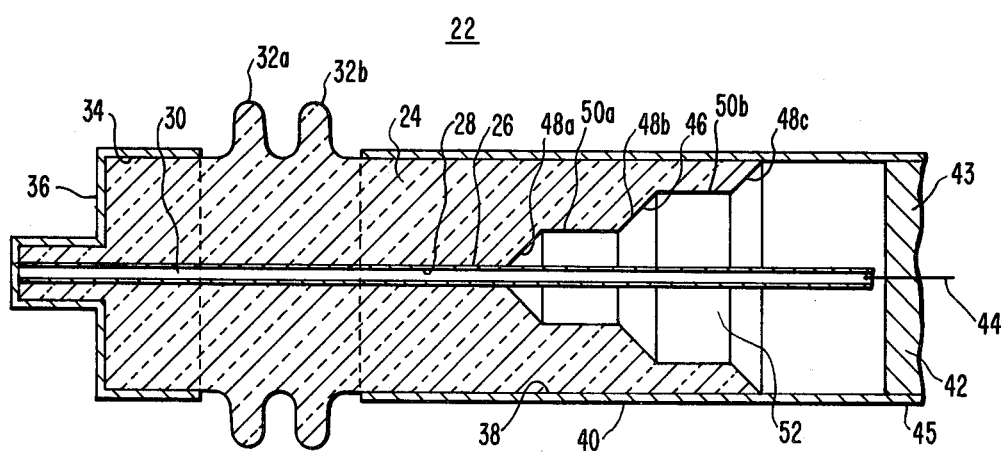
FIG. 2 is a side elevational view in section of a typical embodiment of the entire ceramic to metal end seal design of the present invention.

The present invention can be best understood by reference to the exemplary drawings of FIGS. 1 and 2. The ceramic end seal design is in its simplest form in the embodiment of FIG. 1 wherein a portion of the end seal is seen. The end seal 10 comprises a generally tubular ceramic body 12 with a centralized conductive lead 14 passing through the center of the ceramic body 12, and a coaxial outer sheath 16 disposed about the ceramic body. The sheath 16 would be hermetically connected to the sheath of the instrumentation cable and a gas-filled volume 18 would be provided between the end face of the metal oxide insulator of the cable which is not shown, and the end surface 20 of the ceramic body. The end surface 20 of the ceramic body has a concave shape relative to the center wire looking towards the end surface 20.

In the embodiment of the ceramic end seal, in FIG. 2, the end seal 22 comprises a generally tubular ceramic body 24 having a central passageway 26 extending along the longitudinal axis of the body 24. A metallized surface 28 is provided along the passageway 26. The center conductor tube 30 passes within the passageway 26 and is sealed to the metallized surface 28. This center tube 30 is stainless steel and serves as a central conductor, and as a fill gas tubulation as will be explained later. The ceramic body 24 is formed with convoluted surface projections 32a, 32b which facilitate handling and mounting of the end seal design as well as serving to provide a non-conductive path along this portion of the exterior surface of the end seal. The exterior surface of the ceramic body is metallized on the extending end sections of the body on either side of the convoluted portions 32a and 32b. The metallized surface 34 at one end of the ceramic body has an end cap 36 fitted over it and brazed to it to effect a hermetic seal. A metallized surface 38 provided about the other end of the ceramic body 24 is fitted with an extension of the sheath of the instrumentation cable 40. This sheath is also stainless steel and is brazed to the metallized surface 38, again to provide a hermetic seal. The end cap 36 at the one end of the ceramic body has an aperture through which the center tube 30 passes to permit pressurizing of the instrumentation cable with nitrogen and a small percentage of helium to a pressure of about 300 psi, with the center tube being tipped off to provide a hermetic seal after the fill. The coaxial cable 42 has a center wire 44 which is electrically connected to the center tube 30. The cable 42 has a metal oxide insulator 43 provided about the center wire. The outer sheath 45 of the cable 42 is brazed to the metallized ceramic surface on the ceramic body or can be brazed to a tubular metal extension extending from the ceramic body. The end surface 46 of the ceramic body 24 facing the cable end has a plurality of stepped concave surface sections 48a, 48b, 48c, which are preferable at about a 45° angle from the longitudinal axis of the center tube 30, with stepped coaxial transition surfaces 50a and 50b provided respectively between concave surfaces 48a and 48b, and then between 48b and 48c. A gas fill chamber 52 is thus defined between the end surface 46 of the ceramic body and the end termination of the cable insulator. The multiple concave surfaces with coaxial steps are used in the end surface space to increase the breakdown path. This end surface design permits easy fabrication, and the cable and end seal has been shown to work at high temperature, high voltage without breakdown pulse noise.

We claim:

1. A high voltage, high temperature coaxial end seal for use with hermetically sealed nuclear instrumentation cables and sensors which end seal comprises:

a tubular ceramic body with a central passage therethrough along the longitudinal axis of the ceramic body, with the ceramic surface defining the central passage having a metallized layer thereon, and the exterior tubular surface of the ceramic body also having a metallized layer thereon, and wherein a central conductor is hermetically sealed within the passage to the metallized surface of the ceramic body, and an outer tubular metal sheath is fitted about the ceramic body and hermetically sealed to the exterior metallized surface of the ceramic body, and wherein a metal end cap is disposed at one end of the tubular ceramic body, which end cap is hermetically sealed to the central conductor and to the ceramic body, and wherein the other end of the tubular ceramic body has a concave end surface relative to the cable end to which it is hermetically sealed.

2. An improved insulator to metal hermetic end seal of the type wherein an elongated tubular insulator has a centralized aperture therethrough with a central electrical conductor passing through the centralized aperture, and wherein a tubular metal sheath is provided about the tubular insulator, with a hermetic seal provided between the central conductor and the insulator and between the insulator and the tubular metal sheath, and wherein a hermetic seal is provided at one end of the elongated tubular insulator between the central conductor and a metal end cap which is hermetically sealed to the insulator, and wherein the other end of the elongated tubular insulator has an end surface which is concave relative to the end of a coaxial cable to which the end seal is sealed so that when the central conductor is maintained at a high positive potential relative to the tubular metal sheath the electric field between the central conductor and the outer sheath tends to collect electrons from the concave end surface of the insulator to the positive biased central conductor, and thereby minimizes breakdown pulse noise generation when instrumentation pulse potentials are applied to the central conductor.

3. A high voltage, high temperature coaxial end seal for hermetically sealed nuclear instrumentation cable which exhibits improved breakdown pulse noise characteristic, wherein coaxial instrumentation cable comprising a center conductor with metal oxide insulating means about the center conductor and a thin metal sheath is provided about the insulating means, is terminated by an end seal means comprising an end seal center conductor connected to the cable center conductor passing through an insulating body having a metal sheath thereabout which is connected and hermetically sealed to the cable sheath, with a hermetically sealed metal end cap at one end of the end seal insulating body, which end cap is sealed to the end seal center conductor and to the end seal sheath, wherein the improved end seal comprises an end seal insulating body end portion facing the cable insulating means having a concave surface relative to the cable insulating means.

4. The end seal set forth in claim 3, wherein the end seal insulating body end portion facing the cable insulating means comprises a plurality of stepped concave surfaces with annular coaxial steps between the concave surfaces.

5. The end seal set forth in claim 3, wherein the concave end surface is at an angle of about 45 degrees relative to the center wire longitudinal axis.

6. The end seal set forth in claim 3, wherein the center conductor and sheaths are nickel steel and the insulating means is dense metal oxide.

7. The end seal set forth in claim 3, wherein the hermetically sealed cable and end seal are pressurized with inert gas.

8. The end seal set forth in claim 3, wherein the center conductors are operated at a high positive potential relative to the sheaths.

* * * * *